United States Patent [19]

Liou

[11] Patent Number: 5,410,952
[45] Date of Patent: May 2, 1995

[54] APPARATUS FOR MAKING A NOODLE WITH STUFFING

[76] Inventor: David Liou, P.O. 82-144, Taipei City, Taiwan, Prov. of China

[21] Appl. No.: 208,564

[22] Filed: Mar. 10, 1994

[51] Int. Cl.⁶ .......................... A21C 9/00; A23P 1/00
[52] U.S. Cl. ................... 99/450.6; 99/450.1; 99/450.2; 425/112
[58] Field of Search ............... 99/450.1, 450.2, 450.4, 99/450.6; 425/369, 112; 426/274

[56] References Cited

U.S. PATENT DOCUMENTS 4,941,402  7/1990  D'Alterio ...................... 99/450.6

FOREIGN PATENT DOCUMENTS 0178878  4/1986  European Pat. Off. ........... 99/450.1

Primary Examiner—George Yeung
Attorney, Agent, or Firm—Alfred Lei

[57] ABSTRACT

A method for making noodle with stuffing comprising steps of flattening a dough to a plurality of dough sheet, passing the dough sheet between a first roller with smooth surface and a second roller with a plurality of parallel grooves to form a dough sheet with a plurality of parallel grooves, filling the grooves of said dough sheet with stuffing, covering said dough sheet with a second dough sheet to form a sandwiched dough sheet, pressing said sandwiched dough sheet so as to join the second dough sheet firmly with said first dough sheet, and severing said sandwiched dough sheet into a plurality of noodles with stuffing.

1 Claim, 3 Drawing Sheets

APPARATUS FOR MAKING A NOODLE WITH STUFFING

BACKGROUND OF THE INVENTION

It has been found that the conventional noodle is a type of paste of flour and water or flour and eggs prepared in long, narrow strips and usually served in broth. However, such a noodle is simply made of dough and does not have stuffing thereby making it monotonous in taste.

Therefore, it is an object of the present invention to provide a method and apparatus for making a noodle with stuffing which can give delight senses of taste and is fit for mass production.

SUMMARY OF THE INVENTION

This invention relates to a method and apparatus for making noodle with stuffing.

It is the primary object of the present invention to provide a method for making noodle with stuffing which can give delight senses of taste.

It is another object of the present invention to provide an apparatus for making noodle with stuffing which is simple in construction.

It is still another object of the present invention to provide an apparatus for making noodle with stuffing which is low in cost.

It is still another object of the present invention to provide an apparatus for making noodle with stuffing which is fit for mass production.

It is a further object of the present invention to provide an apparatus for making noodle with stuffing which is economical to produce.

Other objects and merits and a fuller understanding of the present invention will be obtained by those having ordinary skill in the art when the following detailed description of the preferred embodiment is read in conjunction with the accompanying drawings wherein like numerals refer to like or similar parts.

DETAILED DESCRIPTION OF THE PREFERRED EMBODIMENT

Figure 1:
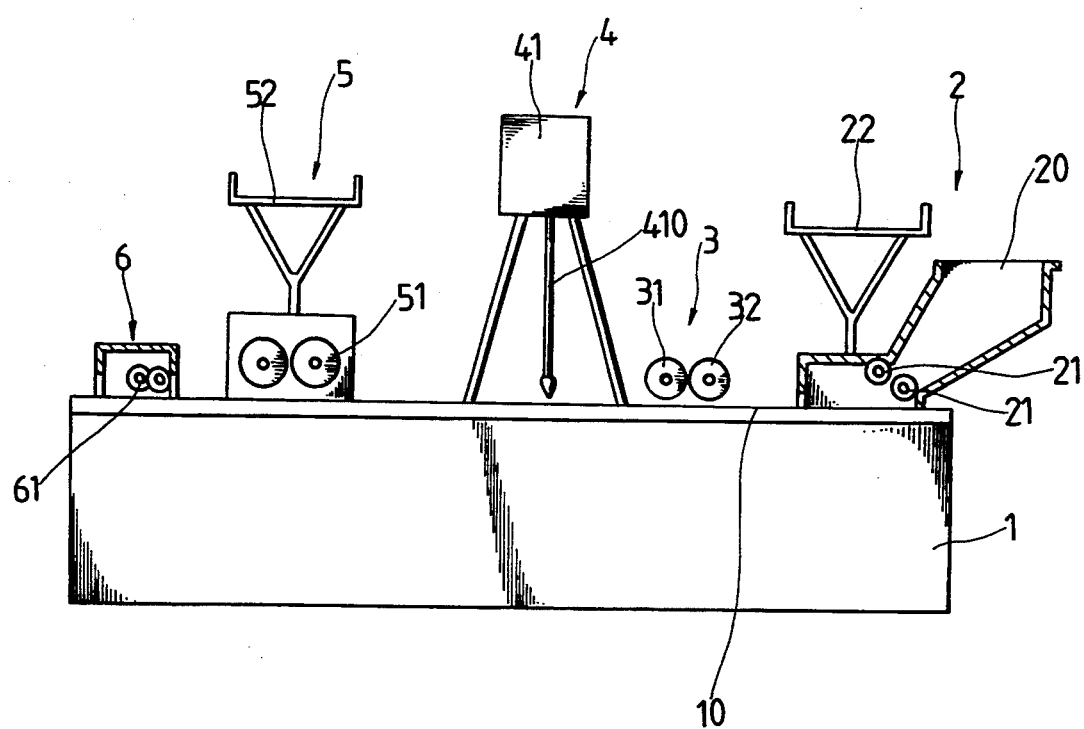
FIG. 1 is a front side of the present invention.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
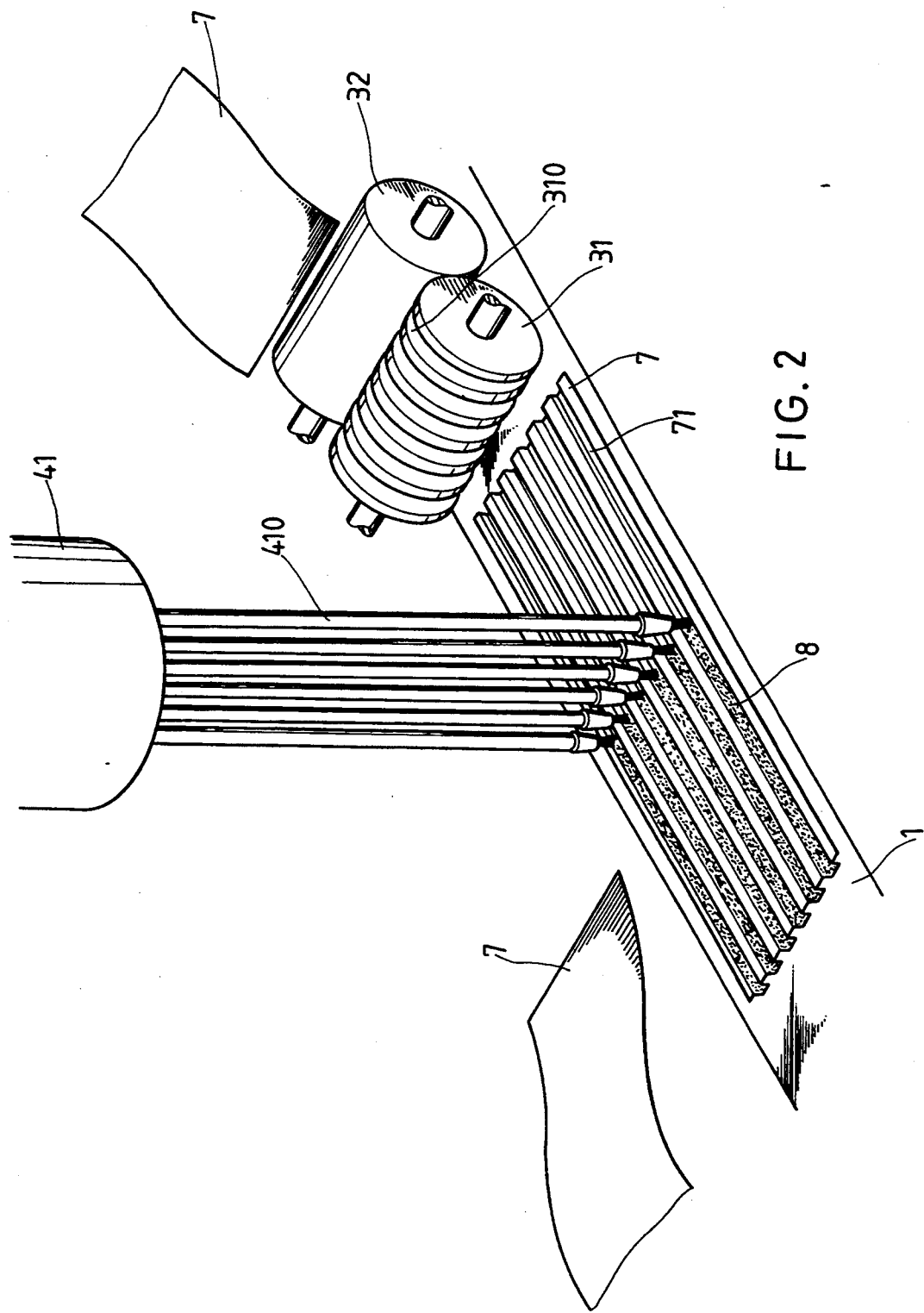
FIG. 2 shows the way to fill the dough sheet with stuffing.
Figure 3:
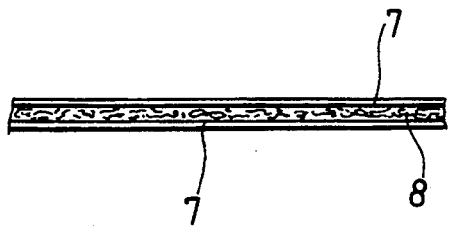
FIG. 3 is a sectional view of the sandwiched dough sheet.
Figure 4:
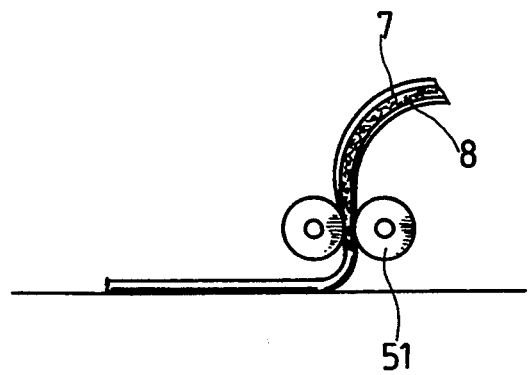
FIG. 4 shows the way how to form a sandwiched dough sheet.
Figure 5:
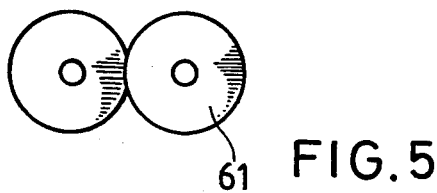
FIG. 5 is a front view of the rolling cutters.
Figure 5A:
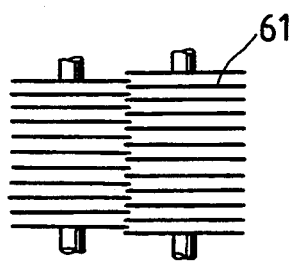
FIG. 5A is a top view of the rolling cutters.

With reference to the drawings and in particular to FIG. 1 thereof, the apparatus for making a noodle with stuffing according to the present invention comprises a platform 1 provided with a belt conveyor 10 thereon. On the platform 1 there are mounted a dough press 2, a shaping tool 3, a stuffing feeder 4, a joining apparatus 5, and a severing device 6. The dough press 2 is provided with a funnel 20 having two rollers 21 for making dough sheets and a frame 22 for hanging the dough sheets for use. Then, place a dough sheet 7 on the belt conveyor 10 which will transmit the dough sheet 7 to the shaping tool 3. The shaping tool 3 is arranged beside the dough press 2 on the platform 1 and includes a first roller 32 with smooth surface and a second roller 31 with a plurality of parallel grooves 310 so that when a first dough sheet 7 passes between the first roller 32 and the second roller 32, the dough sheet 7 will be formed with a plurality of parallel grooves 8. Thereafter, the dough sheet 7 is transmitted to a position under the outlets 410 of the stuffing feeder 4, where the grooves 8 of the dough sheet 7 are filled with stuffing by the stuffing feeder 4 (see FIG. 2) which is located beside said shaping tool 3 on the platform 1. Then, the dough sheet 7 is further transmitted to a place where it is covered with a second dough sheet 7 to form a sandwiched dough sheet (see FIG. 3). Thereafter, the sandwiched dough sheet is passed through between two rollers 51 of the joining device 5 to make the second dough sheet firmly attach on the first dough sheet and make the sandwiched dough sheet thinner (see FIG. 4). Finally, the sandwiched dough sheet is passed through between two rolling cutters 61 of the severing device 6 disposed beside the joining device on the platform 1 thereby cutting the sandwiched dough sheet into a plurality of noodles with stuffing.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An apparatus for making noodle with stuffing comprising:
   a platform provided with a belt conveyor thereon;
   a dough press mounted on said platform and provided with a funnel having two rollers for making dough sheets;
   a shaping tool mounted beside said dough press on said platform and having a first roller with smooth surface and a second roller with a plurality of parallel grooves so that when a first dough sheet passes therethrough, the dough sheet will be formed with a plurality of parallel grooves;
   a stuffing feeder arranged on said platform and beside said shaping tool for filling stuffing in the grooves of said first dough sheet;
   a joining device installed beside said stuffing feeder on said platform and having two rollers for attaching a second dough sheet on said first dough sheet to form a sandwiched dough sheet; and
   a severing device disposed beside said joining device on said platform and provided with two rolling cutters for cutting said sandwiched dough sheet into a plurality of noodles with stuffing.

* * * * *